United States Patent
Thubert et al.

(10) Patent No.: US 12,382,355 B2
(45) Date of Patent: Aug. 5, 2025

(54) MAINTAINING MULTIPLE WIRELESS ASSOCIATIONS VIA AN OVER-THE-WIRE RELAY

(71) Applicant: Cisco Technology, Inc., San Jose, CA (US)

(72) Inventors: Pascal Thubert, Roquefort les Pins (FR); Domenico Ficara, Essertines-sur-Yverdon (CH); Amine Choukir, Lausanne (CH); Alessandro Erta, Licciana Nardi (IT); Salvatore Valenza, Pomy (CH); Sudhir Kumar Jain, Fremont, CA (US); Vincent Cuissard, Eteaux (FR); Kasi Nalamalapu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 527 days.

(21) Appl. No.: 17/899,861

(22) Filed: Aug. 31, 2022

(65) Prior Publication Data

US 2024/0073766 A1    Feb. 29, 2024

(51) Int. Cl.
*H04W 36/18* (2009.01)
*H04W 36/00* (2009.01)
*H04W 84/18* (2009.01)

(52) U.S. Cl.
CPC ......... *H04W 36/035* (2023.05); *H04W 36/18* (2013.01); *H04W 84/18* (2013.01)

(58) Field of Classification Search
None
See application file for complete search history.

(56) References Cited

U.S. PATENT DOCUMENTS

| 8,023,426 B2 | 9/2011 | Liu et al. |
| 9,066,287 B2 | 6/2015 | Merlin et al. |
| 10,735,924 B2 | 8/2020 | Thubert et al. |

(Continued)

FOREIGN PATENT DOCUMENTS

| CN | 113923747 | 1/2022 | |
| WO | WO-2024147984 A1 * | 7/2024 | ............ H04W 40/22 |

OTHER PUBLICATIONS

"MAC Addresses, to DS, from DS in a Wireless Frame", online: https://dot11stream.com/2018/12/01/mac-address-to-ds-from-ds-in-a-wireless-frame/, Dec. 2018, accessed Aug. 2022, 5 pages, dot11stream.com.

(Continued)

*Primary Examiner* — Robert M Morlan
(74) *Attorney, Agent, or Firm* — Behmke Innovation Group LLC; James M. Behmke

(57) ABSTRACT

In one embodiment, a device sends data traffic to a gateway of a backhaul mesh network via a first wireless access point of the backhaul mesh network. The device maintains, while associated with the first wireless access point, an association with a second wireless access point of the backhaul mesh network by sending a frame to the first wireless access point that is relayed by the first wireless access point to the second wireless access point. The device makes a determination that additional data traffic should be sent to the gateway of the backhaul mesh network via the second wireless access point. The device sends, based on the determination, the additional data traffic to the gateway of the backhaul mesh network via the second wireless access point.

20 Claims, 7 Drawing Sheets

(56) References Cited

U.S. PATENT DOCUMENTS

| | | |
|---|---|---|
| 10,951,284 B2 | 3/2021 | Sakoda |
| 2018/0041943 A1 | 2/2018 | Visuri et al. |
| 2018/0375907 A1* | 12/2018 | Ivov .......................... H04N 7/15 |
| 2025/0063462 A1* | 2/2025 | Baudia .................... H04W 4/02 |

OTHER PUBLICATIONS

Rapp, Dale, "The to DS and From DS Fields", online: https://dalewifisec.wordpress.com/2014/05/17/the-to-ds-and-from-ds-fields/, May 2014, accessed Aug. 2022, 3 pages.

"802.11 Association Process Explained", online: https://documentation.meraki.com/MR/WiFi_Basics_and_Best_Practices/802.11_Association_Process_Explained, Oct. 2020, accessed Aug. 2022, 4 pages, Cisco Systems, Inc.

"Common Wireless Event Log Messages and Issues", online: https://documentation.meraki.com/MR/Monitoring_and_Reporting/Common_Wireless_Event_Log_Messages, Jun. 2021, Accessed Aug. 2022, 6 pages, Cisco Systems, Inc.

* cited by examiner

MAINTAINING MULTIPLE WIRELESS ASSOCIATIONS VIA AN OVER-THE-WIRE RELAY

TECHNICAL FIELD

The present disclosure relates generally to computer networks, and, more particularly, to maintaining multiple wireless associations via an over-the-wire relay.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication. Accordingly, wireless mesh networks are now being deployed, to provide connectivity to such fast-moving mobile systems.

While mesh networks can be quite capable of ensuring connectivity with fast-moving vehicles and other mobile systems, the very nature of a fast-moving mobile systems means that it will eventually move away from its current access point and closer towards another access point in the mesh. Typically, the mobile system will reach a point along its travels that the new access point will provide better performance than that if its currently associated access point. In such a case, the mobile system and the new wireless access point will perform a handover exchange, to create a new association between the mobile system and the new access point. This operation is repeated any number of times as the mobile system traverses its path of travel, such as a train track. However, each such handover has at least a minimal chance of failure. This can be due to the next access point being overloaded, the handover message not being well decoded at reception, the handover message not being received, or the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
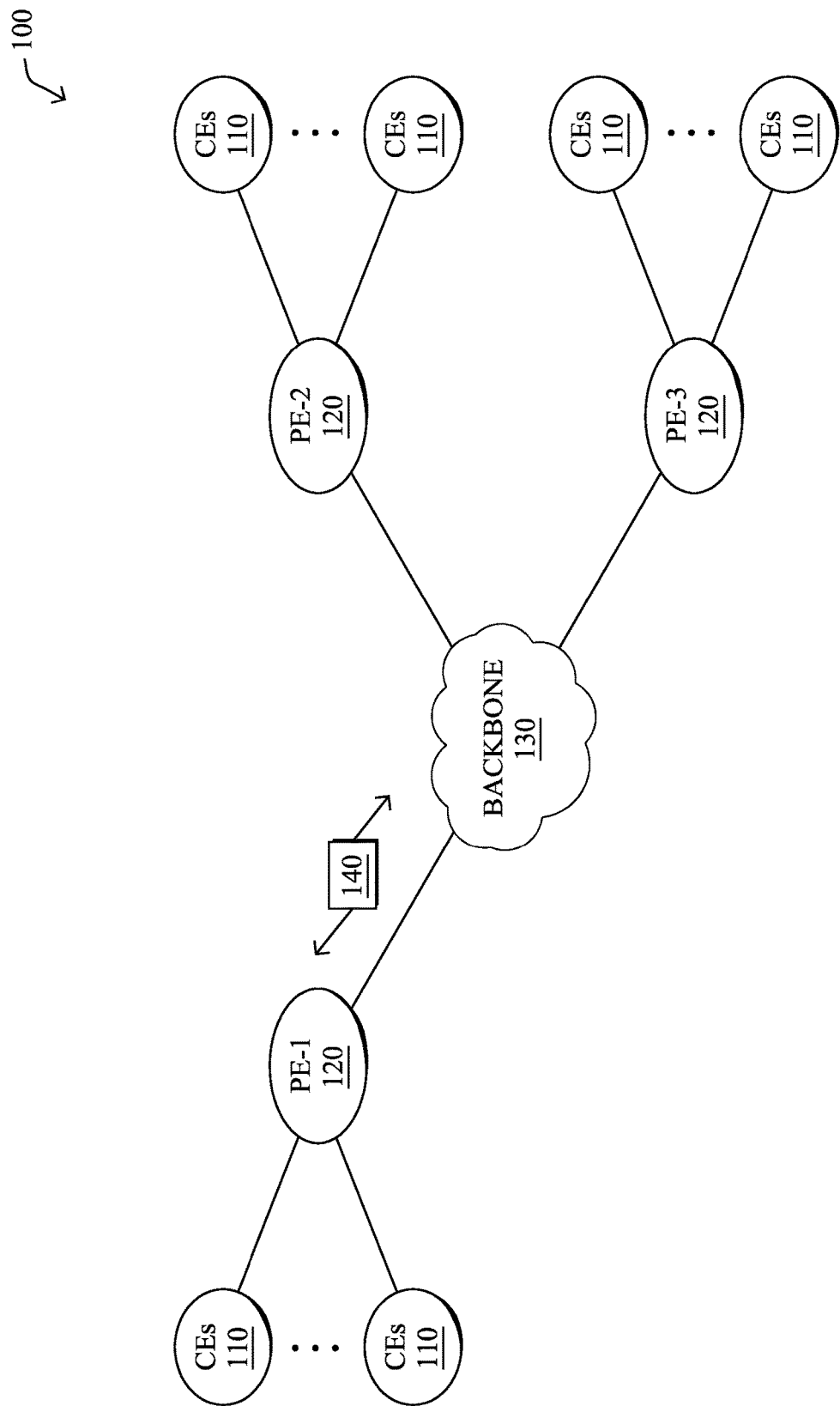
FIGS. 1A-1B illustrate an example communication network.

According to one or more embodiments of the disclosure, a device sends data traffic to a gateway of a backhaul mesh network via a first wireless access point of the backhaul mesh network. The device maintains, while associated with the first wireless access point, an association with a second wireless access point of the backhaul mesh network by sending a frame to the first wireless access point that is relayed by the first wireless access point to the second wireless access point. The device makes a determination that additional data traffic should be sent to the gateway of the backhaul mesh network via the second wireless access point. The device sends, based on the determination, the additional data traffic to the gateway of the backhaul mesh network via the second wireless access point.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
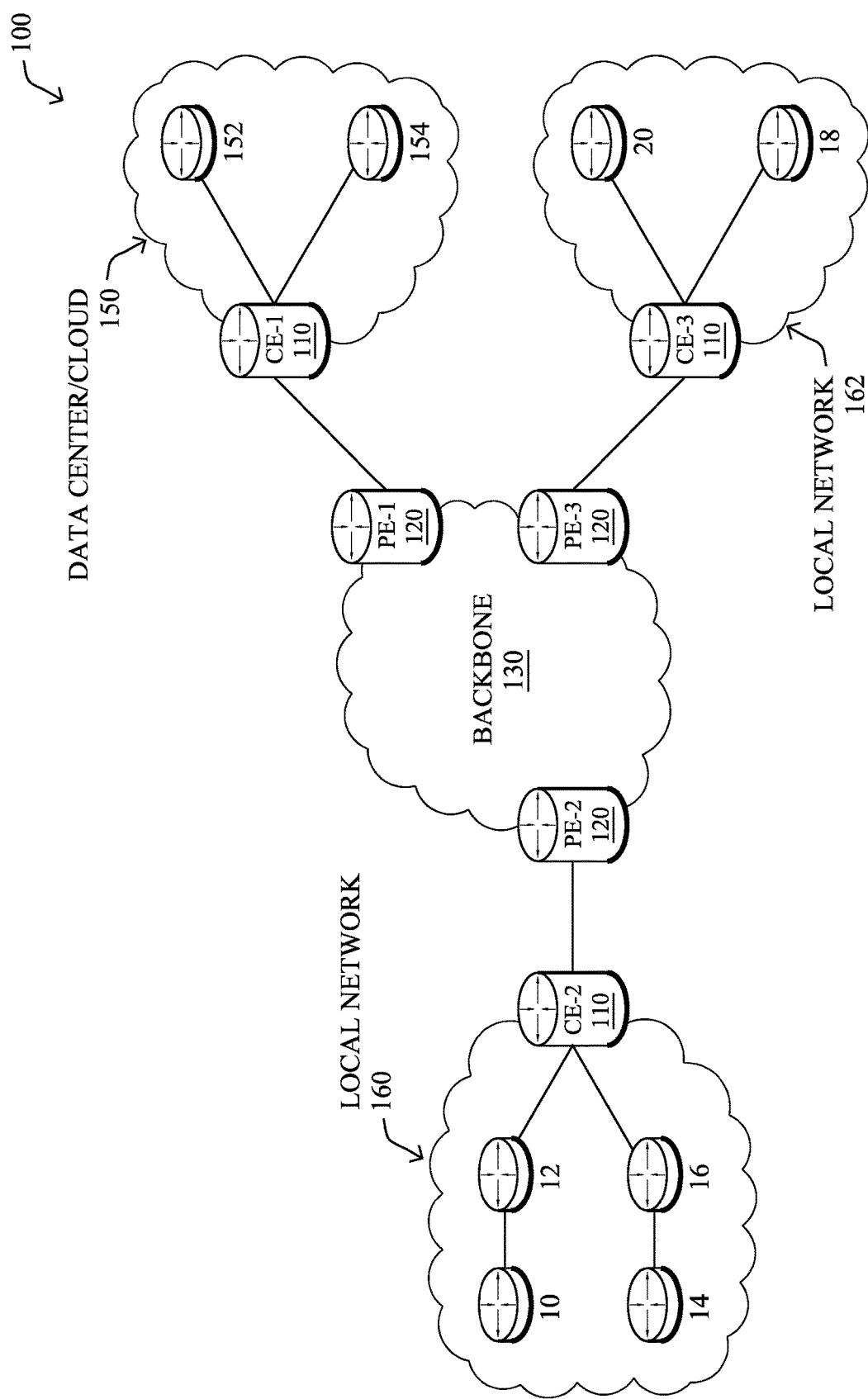

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
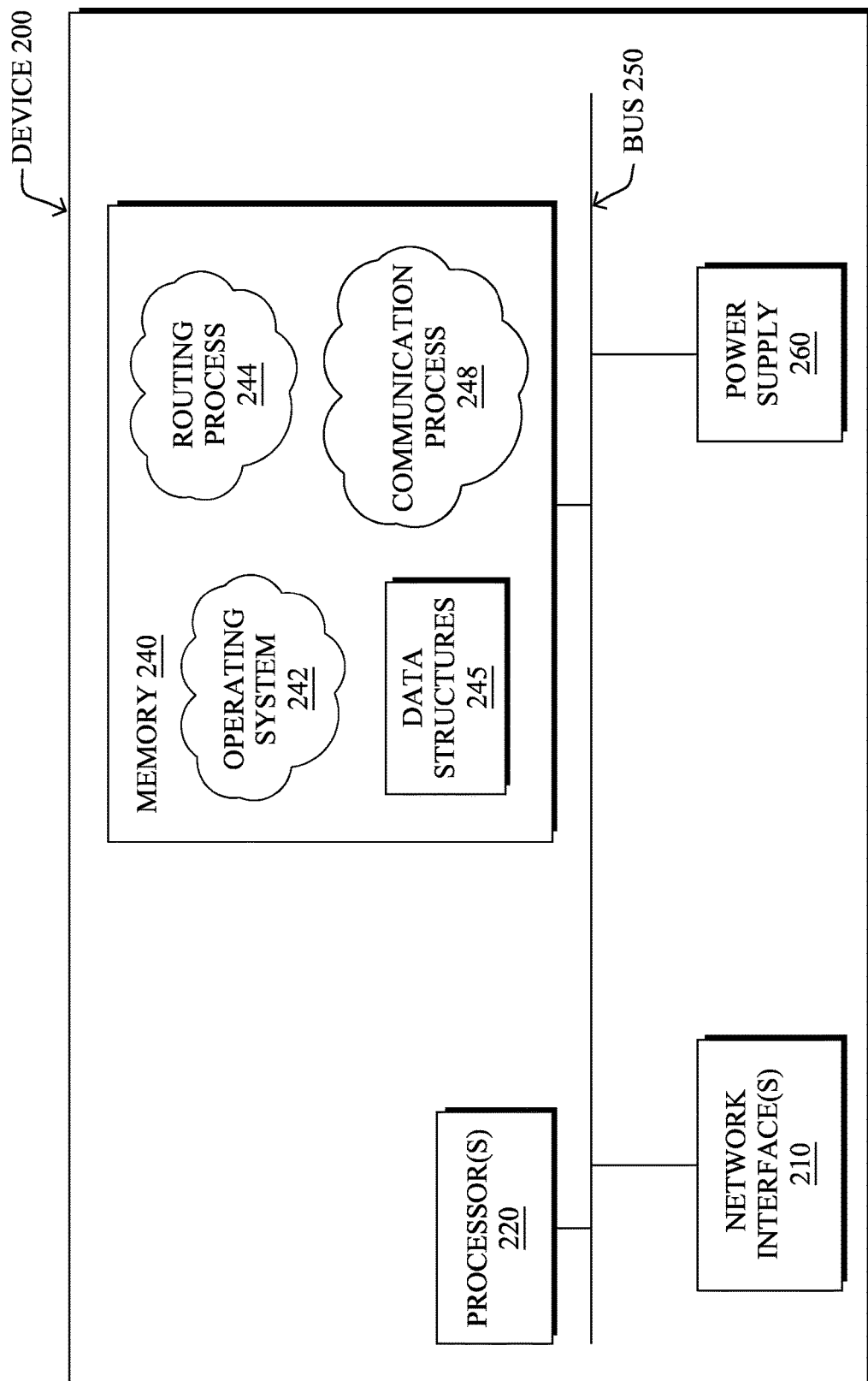
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected/coupled by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE). Another protocol that communication process 248 may utilize is the Control and Provisioning of Wireless Access Points (CAPWAP) protocol.

Figure 3:
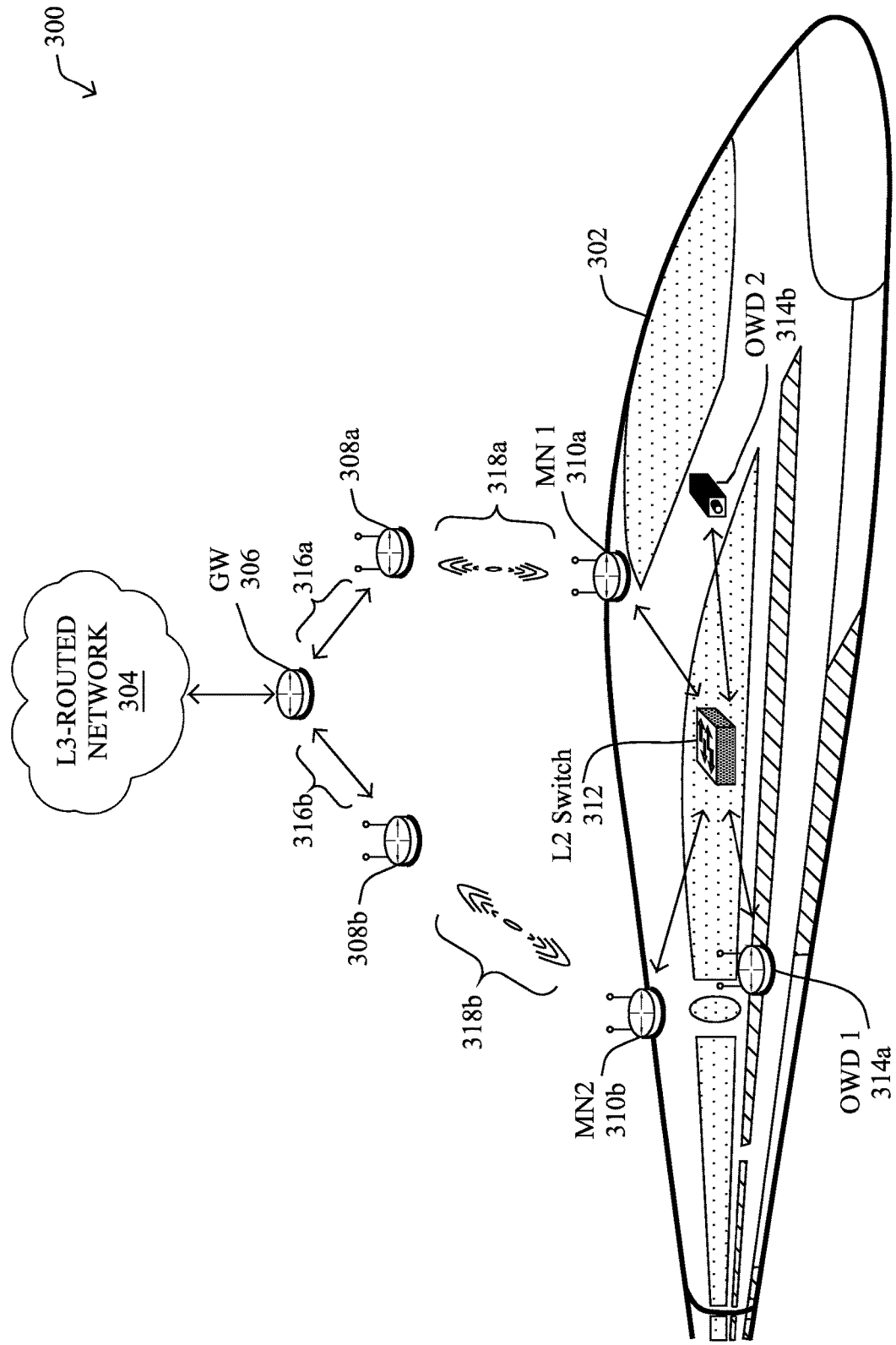
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first mobile node 310a and a second mobile node 310b. Each mobile node 310 may generally include: 1.) a wireless interface to exchange data with wireless access points of the backhaul network and 2.) a local interface to exchange data with the local network of mobile system 302. For instance, mobile node 310a and mobile node 310b may each have a wired connection to L2 switch 312.

As would be appreciated, mobile node 310a and mobile node 310b may be located on mobile system 302 at a distance from one another, so as to provide spatial diversity to the potential wireless connection points utilized by mobile system 302. For example, mobile node 310a may be located near the front of mobile system 302 (e.g., the head-end of a train), while mobile node 310b may be located farther towards the rear of mobile system 302 than that of mobile node 310a. Thus, even if a particular mobile node 310 does not have a reliable wireless connection to the backhaul system, another mobile node 310 of mobile system 302 may (e.g., if the train is going around a curve in the track, etc.). In some instances, mobile nodes 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless base stations/access points 308. For instance, as shown, there may be trackside access points 308a-308b shown. Note that while these wireless access points are referred to herein as 'trackside,' their locations can be varied depending on the deployment scenario (e.g., roadside, etc.).

During operation, access points 308a-308b may form wireless connections with mobile node 310a and/or mobile node 310b, to provide wireless connectivity to mobile system 302 as it travels. To this end, each access point 308 may include at least 1.) a wireless interface to communicate with a mobile node 310 and 2.) an interface to communicate with a gateway 306, denoted "GW" for simplicity. Typically, the connections between access points 308a-308b and gateway 306 are wired connections that use a suitable wired communication protocol, such as Ethernet.

Gateway 306 represents the other end of the backhauling system and provides Layer-3 (L3) routing functions. To do so, gateway 306 may include at least one interface connected to L3-routed network 304, as well as any number of interfaces to communicate with access points 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that mobile node 310a has formed a wireless connection 318a with access point 308a. Such a connection may be formed using a suitable transmission protocol, such as the Prodigy protocol by Fluidmesh (now Cisco Systems) or another wireless protocol that supports extremely fast handovers. Consequently, mobile node 310a may establish a first tunnel over wireless connection 318a. gateway 306 and access point 308a may form a second tunnel via their connection 316a, likewise. Thus, when access point 308a sends traffic that it receives from mobile node 310a towards gateway 306, it may encapsulate the traffic and tunneled via the first tunnel, which access point 308a then encapsulates for transport via the second tunnel to gateway 306. A similar approach may be taken with respect to wireless connection 318b between mobile node 310b and access point 308b, as well as connection 316b between access point 308b and gateway 306.

In alternative embodiments, a single L2 tunnel may be established between each access point 308 and gateway 306. This tunnel will carry L2 traffic between gateway 306 and the mobile node 310 to which the access point 308 is connected. For instance, a first L2 tunnel may be formed between gateway 306 and access point 308a over which traffic conveyed between access point 308a and mobile node 310a may be transported, assuming that wireless connection 318a exists. Similarly, another gateway 306 and access point 308b may form a second L2 tunnel over which traffic conveyed between access point 308b and mobile node 310b may be transported, assuming that wireless connection 318a exists.

Typically, only a single wireless link is active at any given time between a mobile system, such as mobile system 302, and any given access point 308. For instance, assume that mobile node 310a is wirelessly connected to access point 308a. In such a case, any other mobile node 310 on mobile system 302 (e.g., mobile node 310b, etc.) may be in an idle state at that time. In other words, one of the mobile nodes (e.g., mobile node 310a) may be designated as the primary, while the other is designated as the secondary (e.g., mobile node 310b) and remains idle. As mobile system 302 roams, the primary node may begin passing its traffic to the secondary node, to begin leveraging its own connection to the fixed infrastructure. In turn, the roles of the two nodes may be switched, thereby making mobile node 310a the secondary node and mobile node 310b the primary node.

As noted above, while mesh networks can be quite capable of ensuring connectivity with fast-moving vehicles and other mobile systems, the very nature of a fast-moving mobile systems means that it will eventually move away from its current access point and closer towards another access point in the mesh. Typically, the mobile system will reach a point along its travels that the new access point will provide better performance than that if its currently associated access point. In such a case, the mobile system and the new wireless access point will perform a handover exchange, to create a new association between the mobile system and the new access point. This operation is repeated any number of times as the mobile system traverses its path of travel, such as a train track. However, each such handover has at least a minimal chance of failure. This can be due to the next access point being overloaded, the handover message not being well decoded at reception, the handover message not being received, or the like Maintaining Multiple Wireless Associations Via an Over-the-Wire Relay The techniques introduced herein allow for a mobile system to maintain wireless associations with multiple wireless access points of a backhaul mesh network through the use of an over-the-wire relay mechanism. In some embodiments, 'heartbeat' frames from a mobile system may be relayed from one access point to one or more other access points, to keep associations between the mobile system and them alive. By maintaining such associations, even when the mobile system is outside of communication distance with the one or more other access points, this allows the mobile system to roam to any of them without the need to perform a handover exchange, as the mobile system is already associated with that access point.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, in various embodiments, a device identifies a plurality of paths in a wireless backhaul network between a gateway and a plurality of access points that provide wireless connectivity to a mobile system. The device determines a movement of the mobile system. The device determines, based on the movement of the mobile system, that a particular path in the plurality of paths is not needed to provide wireless connectivity to the mobile system. The device causes one or more networking nodes along the particular path to enter into a power saving mode.

Figure 4A:
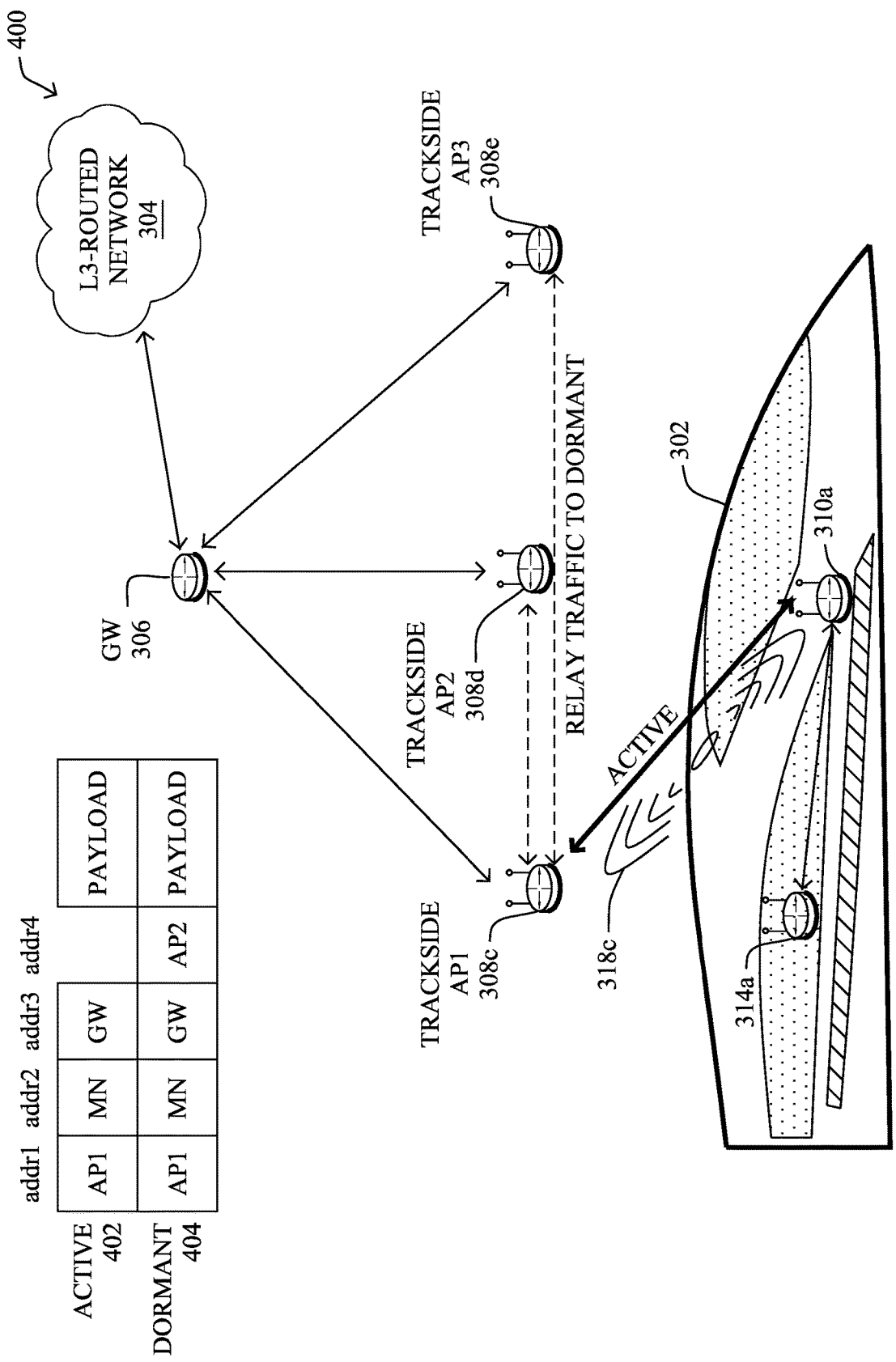
FIGS. 4A-4B illustrate an example of maintaining multiple wireless associations via an over-the-wire relay.
Figure 4B:
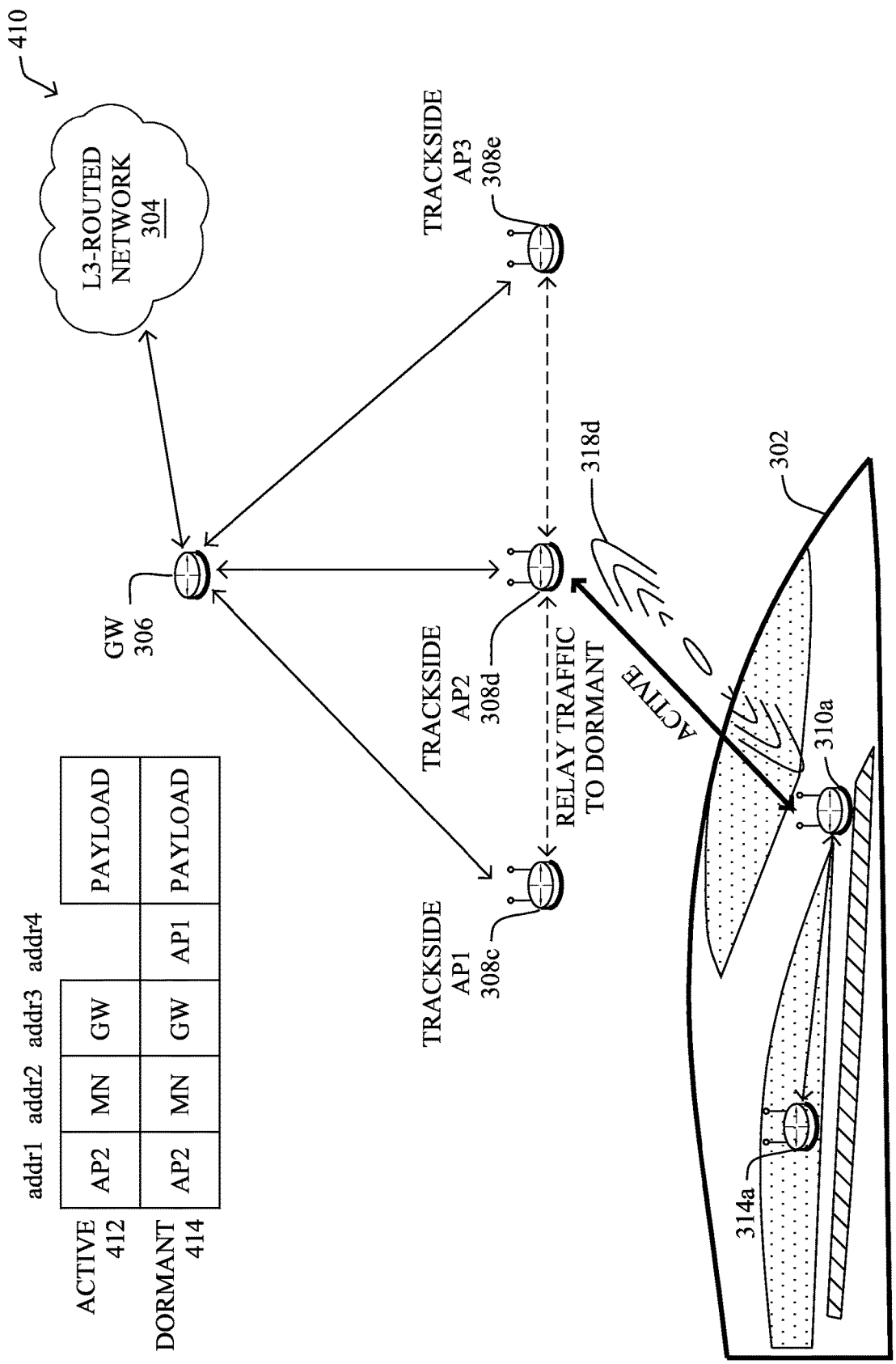

Operationally, FIGS. 4A-4B illustrate an example of maintaining multiple wireless associations via an over-the-wire relay, according to various embodiments. As shown in example 400 in FIG. 4A, consider again the case of mobile system 302 moving along a path of travel. For simplicity, only a single mobile node 310 is shown. However, as would be appreciated, the techniques introduced herein may be performed to maintain associations between any number of mobile nodes onboard mobile system 302 and any number of access points 308 in the mesh network.

As would be appreciated, a wireless association between a mobile node and an access point is typically a prerequisite before the mobile node may use the access point to wirelessly send data traffic via the access point. Traditionally, a wireless association is formed through a series of exchanges between the mobile node and the access point, such as by first discovering the presence of one another via probing, authenticating the mobile node, and finally establishing the association after the mobile node is properly authenticated. Once such an association is formed, though, the mobile node may also become disassociated with the access point over time. This can occur, for instance, due to inactivity by the mobile node, deauthentication of the mobile node, for load balancing purposes, or the like. Here, with fast moving mobile systems, such as mobile system 302, inactivity is very likely to cause its mobile node 310 to become disassociated over time with a particular access points 308, as mobile system 302 moves away from it.

In various embodiments, the techniques herein propose allowing a device, such as mobile node 310a, to maintain N-number of wireless associations with N-number of access points 308. The intuition is that doing so allows a mobile node 310 of mobile system 302 to seamlessly transition from using one access point 308 for connectivity to using another access point 308, without having to perform any real roaming operation (e.g., having to re-establish an association with the new access point). In some embodiments, each radio of mobile system 302 may maintain a single 'active' association with a particular access point 308 and N-1 'dormant' associations with N-1 other access points 308. These associations may be kept alive by some heartbeat frame sent over-the-wire in the mesh network. By doing so, mobile system 302 does not need to be in direct communication with any of its dormant access points 308, but still associated with them, and also preventing these associations from timing out.

Despite access points 308 being potentially kilometers away from one another, the 'active' access point 308 for a given mobile node 310 may relay a keepalive/heartbeat frame from mobile node 310 to its 'dormant' access points 308, to maintain its association(s) with them. For instance, as shown in FIG. 4A, consider the case in which mobile node 310a has an active wireless connection 318c with access point 308c of the backhaul mesh network. This allows mobile node 310a to send data traffic (e.g., from device 314a onboard mobile system 302) to gateway 306 via access point 308c over the active wireless connection 318c.

Thus, data frames sent by mobile node 310a that are destined for gateway 306 via access point 308c may take the form of active frame 402 shown. More specifically, active frame 402 may include a data payload with a header that indicates the address of access point 308c in a first address field (e.g., to denote that active frame 402 is being sent to access point 308c), the address of mobile node 310a (denoted 'MN') in the second address field of the header, and the address of gateway 306 in the third address field of the header as the final destination of the frame. Typically, these addresses are the media access control (MAC) addresses of the corresponding nodes/devices, although other types of addresses could also be used, in further implementations. Doing so signals to access point 308c to send the frame 402 onward to gateway 306, which may then process and send the payload onward, as necessary (e.g., onward to L3-routed network 304).

In various embodiments, the techniques herein propose that mobile node 310a also send another type of frame to its active access point, access point 308c, to maintain associations with its other, dormant access points in the network, such as access point 308d and access point 308e. For instance, mobile node 310a may send a dormant frame 404 of the form shown to access point 308a via its active wireless connection 318c. Similar to active frame 402, dormant frame 404 may include the address of access point 308c in its first address field, the address of mobile node 310a in its second address field, the address of gateway 306 in its third address field, as well as the address of the target, dormant access point with which mobile node 310a is to maintain its association. For example, in the case shown in FIG. 4A, the first address field of dormant frame 404 may be the address of access point 308d or access point 308e, with which mobile node 310a may already have an association, but is not currently using as its active access point.

Here, if frame 404 is in 802.11 format, mobile node 310a may also set the "from the DS" and "to the DS" bits of the header of the frame. This is because the 802.11 standard requires that these bits also be set, in order to use its fourth address field.

By receiving a frame 404 from mobile node 310a that includes an indication of another wireless access point, such as the address of the other wireless access point in the fourth address field of the frame, this signals to access point 308c that the frame should be relayed to that other access point via the network. In some embodiments, access point 308c may do so by tunneling the frame 404 to the other access point, such as access point 308d or access point 308e, with which mobile node 310a has dormant wireless associations. In one embodiment, this can be achieved by access point 308c using MAC-in-MAC encapsulation in the backhaul mesh network, although other tunneling mechanisms could also be used. Note that such tunneling could be either direct (e.g., from access point 308c directly to access point 308d) or indirect (e.g., from access point 308c to gateway 306 and onward to access point 308d), depending on the layout of the backhaul mesh network.

In another embodiment, MAC-in-MAC encapsulation could be used whereby the frames 404 from mobile node 310a are 802.3 format frames that are sent to the other access points 308 by tunneling them into 802.11 regular 3-address connections to the active access point 308c.

In yet another embodiment, gateway 306 may be configured to maintain and/or remove associations between mobile node 310a and the access points 308. For instance, if the selection of a given access point access points 308 to be used by mobile node 310a at any given time is made centrally, gateway 306 may explicitly message the access points 308 in the network to either keep their associations active with mobile node 310a or remove them, as needed.

As shown in the example 410 in FIG. 4B, a key advantage of maintaining the dormant associations between mobile node 310a and access points 308d-308e is that mobile node 310a does not need to perform a handover exchange with them, when it decides to switch from using access points 308a as its active access point to using access point 308d. For instance, mobile node 310a may decide to begin using an active connection 318d with access point 308d to send its data traffic to gateway 306, instead of access point 308c. Since mobile node 310a has already maintained its association with access point 308d via the frames relayed by access point 308c, it will not need to perform a handover exchange that has the potential to fail and leading to poor performance.

The decision to switch from using access point 308c to using access point 308d may be based on any number of factors. In some instances, mobile node 310a may make the decision based on the received signal strength indicator (RSSI) values, signal-to-noise (SNR) ratios, etc., of beacons or other messages sent by access points 308c-308d, to select the access point 308 that offers the best performance. In further embodiments, such as when mobile system 302 travels a known and repetitive path of travel, mobile node 310a may base the decision on the physical location of mobile system 302 (e.g., based on prior knowledge that access point 308*d* will offer better signal than access point 308*c* after mobile system 302 passes a curve in the train track, etc.). In yet other embodiments, the decisions may be controlled by a central service (e.g., a service provided by gateway 306, a remote server, etc.). In addition, the decision to switch over the active access point 308 of mobile node 310*a* may be based on a machine learning model that has been trained to select the optimal access points 308 for mobile node 310*a* at any given time.

With respect to the frames sent by mobile node 310*a*, all that is needed to utilize active connection 318*d* would be to send active frames 412 with the addresses of access point 308*d*, mobile node 310*a*, and gateway 306 in the first three address fields of its header. This indicates to access point 308*d* that the active frames active frames 412 carrying the data traffic payloads (e.g., from device 314*a*) should be sent onward to gateway 306.

Regardless of the reason for switching the active access point over to another access point, mobile node 310*a* may also repeat the above approach to continue to maintain its wireless associations with one or more other access points 308, in addition to its now currently active access point 308*d*. For instance, mobile node 310*a* may send dormant frames 414 to access point 308*d*, this time with the address of the target, dormant access point access points 308. In turn, access point 308*d* may relay the frame 414 to that access point, so that mobile node 310*a* can maintain its wireless association with it. Note that the dormant access points 308 of mobile node 310*a* may also be at any location relative to it. For instance, while mobile node 310*a* may maintain its association with access point 308*e* so that it can switch to using it at a further point in time (e.g., as it moves away from access point 308*d* and closer towards access point 308*e*), mobile node 310*a* may also maintain its associations with any of its prior active access points 308, as well. For instance, even though mobile node 310*a* has passed access point 308*c*, it may still maintain its association with it, since mobile system 302 may still utilize it at some later time, such as on its return trip.

Figure 5:
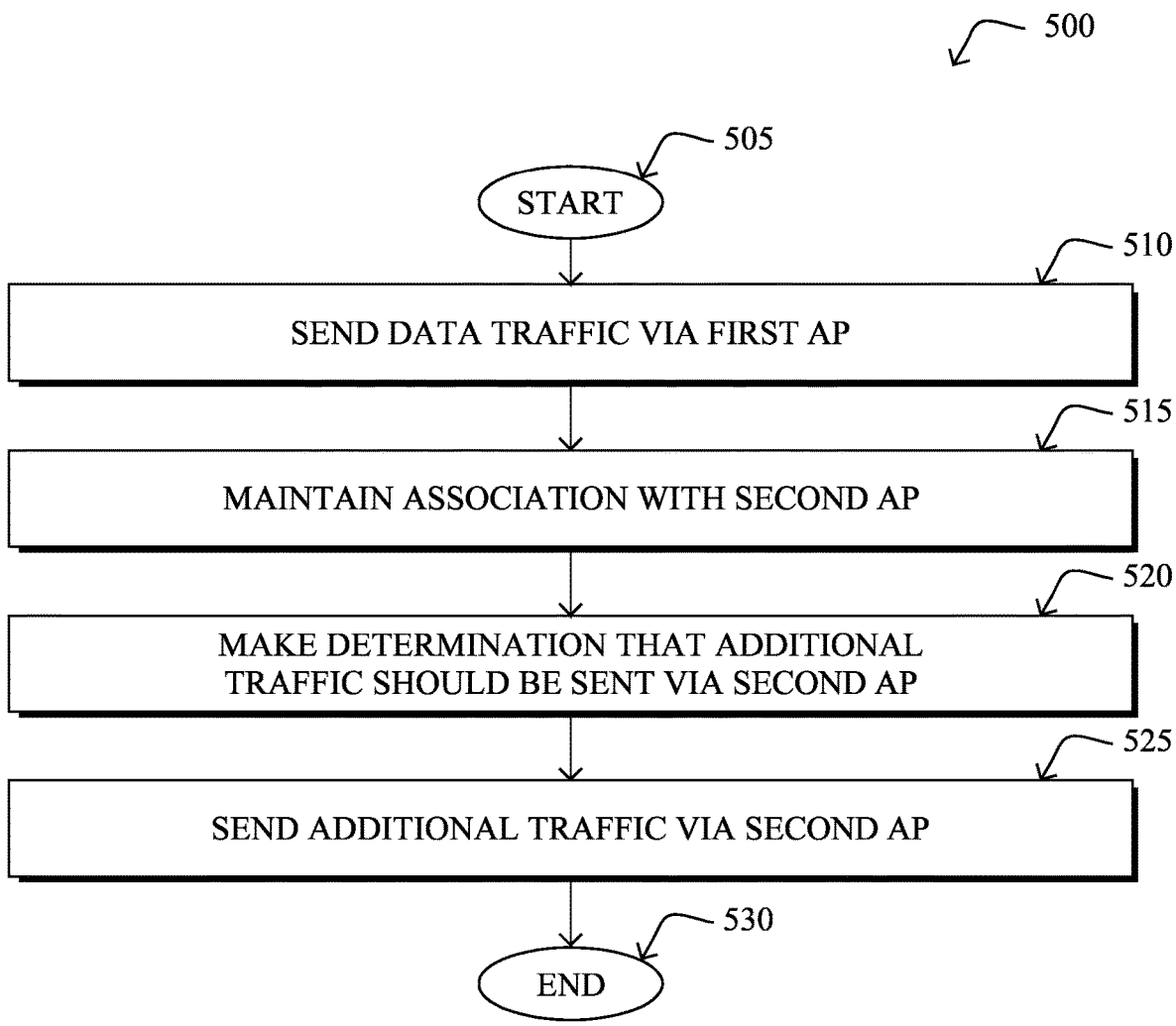
FIG. 5 illustrates an example simplified procedure for maintaining multiple wireless associations via an over-the-wire relay.

FIG. 5 illustrates an example simplified procedure (e.g., a method) for maintaining multiple wireless associations via an over-the-wire relay, in accordance with one or more embodiments described herein. For example, a non-generic, specifically configured device/apparatus (e.g., device 200) may perform procedure 500 by executing stored instructions (e.g., communication process 248 and/or routing process 244).

Procedure 500 may start at step 505 and continues on to step 510 where, as described in greater detail above, the device may send data traffic to a gateway of a backhaul mesh network via a first wireless access point of the backhaul mesh network. In various embodiments, the device is located onboard a vehicle or autonomous robot.

At step 515, as detailed above, the device may maintain, while associated with the first wireless access point, an association with a second wireless access point of the backhaul mesh network by sending a frame to the first wireless access point that is relayed by the first wireless access point to the second wireless access point. In some embodiments, the first wireless access point relays the frame to the second wireless access point based on an indication of the second wireless access point included in the frame by the device. In one embodiment, the indication is included in a fourth address field of an 802.11 header of the frame. In another embodiment, the indication comprises a media access control (MAC) address of the second wireless access point. In a further embodiment, the frame is an 802.3 frame.

At step 520, the device may make a determination that additional data traffic should be sent to the gateway of the backhaul mesh network via the second wireless access point, as described in greater detail above. In some embodiments, the device makes the determination based on a location of the device or a received signal strength indicator (RSSI) value of a beacon sent by the second wireless access point.

At step 525, as detailed above, the device may send, based on the determination, the additional data traffic to the gateway of the backhaul mesh network via the second wireless access point. In some embodiments, the device may also maintain an association with the first wireless access point by sending a frame to the second wireless access point that is relayed by the first wireless access point to the second wireless access point, after sending the additional data traffic to the gateway of the backhaul mesh network via the second wireless access point. In one embodiment, the gateway removes an association between the device and the first wireless access point. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for maintaining multiple wireless associations via an over-the-wire relay, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    sending, by a device, data traffic to a gateway of a backhaul mesh network via a first wireless access point of the backhaul mesh network;
    maintaining, by the device and while associated with the first wireless access point, an association with a second wireless access point of the backhaul mesh network by sending a frame to the first wireless access point that is relayed by the first wireless access point to the second wireless access point;
    making, by the device, a determination that additional data traffic should be sent to the gateway of the backhaul mesh network via the second wireless access point; and sending, by the device and based on the determination, the additional data traffic to the gateway of the backhaul mesh network via the second wireless access point.

2. The method as in claim 1, wherein the device makes the determination based on a location of the device or a received signal strength indicator (RSSI) value of a beacon sent by the second wireless access point.

3. The method as in claim 1, further comprising:
maintaining, by the device, an association with the first wireless access point by sending a frame to the second wireless access point that is relayed by the first wireless access point to the second wireless access point, after sending the additional data traffic to the gateway of the backhaul mesh network via the second wireless access point.

4. The method as in claim 1, wherein the first wireless access point relays the frame to the second wireless access point based on an indication of the second wireless access point included in the frame by the device.

5. The method as in claim 4, wherein the indication is included in a fourth address field of an 802.11 header of the frame.

6. The method as in claim 4, wherein the indication comprises a media access control (MAC) address of the second wireless access point.

7. The method as in claim 1, wherein the first wireless access point relays the frame to the second wireless access point via a tunnel in the backhaul mesh network.

8. The method as in claim 1, wherein the frame is an 802.3 frame.

9. The method as in claim 1, wherein the gateway removes an association between the device and the first wireless access point.

10. The method as in claim 1, wherein the device is located onboard a vehicle or autonomous robot.

11. An apparatus, comprising:
one or more network interfaces;
a processor coupled to the one or more network interfaces and configured to execute one or more processes; and
a memory configured to store a process that is executable by the processor, the process when executed configured to:
send data traffic to a gateway of a backhaul mesh network via a first wireless access point of the backhaul mesh network;
maintain, while associated with the first wireless access point, an association with a second wireless access point of the backhaul mesh network by sending a frame to the first wireless access point that is relayed by the first wireless access point to the second wireless access point;
make a determination that additional data traffic should be sent to the gateway of the backhaul mesh network via the second wireless access point; and
send, based on the determination, the additional data traffic to the gateway of the backhaul mesh network via the second wireless access point.

12. The apparatus as in claim 11, wherein the apparatus makes the determination based on a location of the apparatus or a received signal strength indicator (RSSI) value of a beacon sent by the second wireless access point.

13. The apparatus as in claim 11, wherein the process when executed is further configured to:
maintain an association with the first wireless access point by sending a frame to the second wireless access point that is relayed by the first wireless access point to the second wireless access point, after sending the additional data traffic to the gateway of the backhaul mesh network via the second wireless access point.

14. The apparatus as in claim 11, wherein the first wireless access point relays the frame to the second wireless access point based on an indication of the second wireless access point included in the frame by the apparatus.

15. The apparatus as in claim 14, wherein the indication is included in a fourth address field of an 802.11 header of the frame.

16. The apparatus as in claim 14, wherein the indication comprises a media access control (MAC) address of the second wireless access point.

17. The apparatus as in claim 11, wherein the first wireless access point relays the frame to the second wireless access point via a tunnel in the backhaul mesh network.

18. The apparatus as in claim 11, wherein the frame is an 802.3 frame.

19. The apparatus as in claim 11, wherein the apparatus is located onboard a vehicle or autonomous robot.

20. A tangible, non-transitory, computer-readable medium storing program instructions that cause a device to execute a process comprising:
sending, by the device, data traffic to a gateway of a backhaul mesh network via a first wireless access point of the backhaul mesh network;
maintaining, by the device and while associated with the first wireless access point, an association with a second wireless access point of the backhaul mesh network by sending a frame to the first wireless access point that is relayed by the first wireless access point to the second wireless access point;
making, by the device, a determination that additional data traffic should be sent to the gateway of the backhaul mesh network via the second wireless access point; and
sending, by the device and based on the determination, the additional data traffic to the gateway of the backhaul mesh network via the second wireless access point.

* * * * *